United States Patent [19]

Takino et al.

[11] Patent Number: 4,615,748

[45] Date of Patent: Oct. 7, 1986

[54] AMORPHOUS SOFT MAGNETIC THIN FILM

[75] Inventors: Hiroshi Takino; Kiyonori Hayakawa; Kazuko Kawabata; Makoto Tsuruoka, all of Kanagawa, Japan

[73] Assignee: Sony Corporation, Tokyo, Japan

[21] Appl. No.: 788,140

[22] Filed: Oct. 16, 1985

[30] Foreign Application Priority Data

Oct. 16, 1984 [JP] Japan .................................... 216968

[51] Int. Cl.[4] .............................................. C04B 35/00

[52] U.S. Cl. .................................... 148/304; 148/313; 420/435; 428/606

[58] Field of Search ...................... 148/31.55, 403, 425; 420/435

[56] References Cited

U.S. PATENT DOCUMENTS 4,440,585 4/1984 Kanehira ............................ 148/403

4,557,769 12/1985 Shimada et al. ................ 148/31.55

FOREIGN PATENT DOCUMENTS 57-19358 2/1982 Japan .................................. 148/403

*Primary Examiner*—John P. Sheehan

*Attorney, Agent, or Firm*—Hill, Van Santen, Steadman & Simpson

[57] ABSTRACT

An improved amorphous soft magnetic material particularly useful as a thin film for a magnetic recording and reproducing head. The amorphous material has the formula:

$$Co_{1-x-y}Hf_xPd_y$$

where x is in the range from 0.04 to 0.08 and y is in the range from 0.005 to 0.15.

The thin film is characterized by a high saturation magnetic flux density and a low saturation magnetostriction constant.

5 Claims, 2 Drawing Figures

AMORPHOUS SOFT MAGNETIC THIN FILM

BACKGROUND OF THE INVENTION

1. Field of the Invention

The present invention is in the field of soft magnetic material suitable for use in magnetic recording heads consisting of a cobalt base amorphous material containing from 4 to 8 atomic percent of hafnium and 0.5 to 15 atomic percent of palladium. This material has a higher saturation magnetic flux density Bs and lower saturation magnetostriction λs.

2. Description of the Prior Art

In the field of magnetic recording, the tendency is towards increasing the density and the frequency of the recording signals, as evidenced by the perpendicular magnetic recording system. For use therewith, magnetic tapes having high residual magnetic flux density Br or a high coercive force Hc, such as metal powder tapes in which powders of ferromagnetic metals such as Fe, Co or Ni are used as magnetic powders or evaporated tapes in which a ferromagnetic metal material is evaporated on the base film have been suggested. The material of the magnetic head used for recording and-/or reproduction of this type of magnetic recording medium must be large in saturation magnetic flux density Bs and magnetic permeability and hence must be lower in its saturation magnetostriction constant λs.

In any high density magnetic recording system, the recording track of the magnetic recording medium tends to be quite narrow. Thus, the recording track of the magnetic head must also be narrow in width.

It has previously been suggested to provide a so-called composite magnetic head in which an insulating layer and a soft magnetic thin film adapted to serve as the magnetic core are alternately disposed on a non-magnetic base such as a ceramic, or to provide a thin film magnetic head in which soft magnetic films and thin conductive films are arranged in a multi-layer structure using intermediate insulating layers. Recently, amorphous soft magnetic films have been developed for use with this type, of magnetic head.

These amorphous soft magnetic films are known to have a number of advantages such as near-zero magnetostriction, a higher magnetic permeability, and freedom from crystal magnetic anisotropy, and are highly useful as soft magnetic thin films for such magnetic heads.

It is known to make up amorphous soft magnetic thin films using metal-metalloid systems containing metalloid elements in addition to metal elements such as Fe, Ni and Co. It is difficult, however, with the metal-metalloid amorphous alloys to secure a predetermined saturation magnetic flux density Bs. For example, in a perpendicular magnetic recording single pole head, when it is desired to reduce the main magnetic pole film thickness to less than 3000 Å, the soft magnetic thin film making up the main magnetic pole must have a saturation magnetic flux density Bs higher than about 14000 Gauss. The saturation magnetic flux density Bs of the above described metal-metalloid amorphous alloy, however, is only on the order of 10000 Gauss.

Metal-metal amorphous alloys of the Co-Zr and Co-Hf series have recently evolved as amorphous alloys having a high saturation magnetic flux density. However, these metal-metal amorphous alloys while exhibiting an extremely high saturation magnetic flux density on the order of 15000 Gauss for a Zr or Hf ratio of about 5 atomic percent, have a large saturation magnetostriction constant on the order of $+3\times10^{-6}$. Therefore, the initial magnetic permeability is lower than about 2000 along the hard magnetization axis for the frequency range of 1 to 10 MHz. The published, unexamined Japanese Patent Application No. 207308/82 laid open to the public on Dec. 20, 1984 describes such a cobalt-hafnium amorphous soft magnetic film.

There has also been suggested a Co-Zr-Nb amorphous alloy in which Nb is added to the aforementioned composition for reducing the saturation magnetostriction constant λs. For example, with a Co percentage of 93 atomic percent at most, and a ratio of Zr:Nb equal to 3:5, the amorphous alloy has a saturation magnetostriction constant λs equal to zero and an initial magnetic permeability higher than 3000 along the hard magnetization axis for the frequency range of 1 to 10 MHz. The alloys thus exhibit acceptable soft magnetic properties. However, the saturation magnetic flux density Bs of these materials is less than about 14000 Gauss.

In summary, there has not been developed a soft magnetic thin film satisfying the requirements for both the saturation magnetic flux density Bs and the saturation magnetostriction constant λs.

It has been suggested in our prior Japanese Patent Application No. 95302/1984 to use a Co-Hf-Pt amorphous soft magnetic thin film wherein the saturation magnetic flux density Bs is higher than 14000 Gauss and the saturation magnetostriction constant λs is less than $+1.5\times10^{-6}$. However, to realize a saturation magnetic flux density Bs higher than 15000 Gauss and a saturation magnetostriction constant λs less than $+1.5\times10^{-6}$, the compositional range for which these two requirements are simultaneously satisfied is very narrow.

SUMMARY OF THE INVENTION

The present invention is intended to meet the above requirements and provide a non-crystalline soft magnetic thin film wherein the saturation magnetic flux density Bs is as large as 15000 Gauss or more and the saturation magnetostriction constant λs is as low as $+1.0\times10^{-6}$ or less, and wherein these properties are realized over a wider compositional range.

The present inventors have found that the above objective can be met by an amorphous soft magnetic thin film having controlled amounts of Co, Hf and Pd. The present invention provides an amorphous soft magnetic thin film represented by the general formula $$Co_{1-x-y}Hf_xPd_y$$

where x is in the range from 0.04 to 0.08 and y is in the range from 0.005 to 0.15.

Through the addition of Pd to the Co-Hf binary amorphous alloy, it is possible to lower the saturation magnetostriction constant λs without lowering the high saturation magnetic flux during characteristic of the Co-Hf amorphous alloy over a wide compositional range.

The present invention therefore provides an amorphous soft magnetic film in which, by the addition of Pd to Co and Hf, the saturation magnetic flux density Bs is as high as 15000 Gauss or higher and the saturation magnetostriction constant λs is as low as $+1.0\times10^{-6}$ or lower.

The amorphous soft magnetic thin film of the present invention can be applied to a single pole magnetic head for perpendicular magnetic recording or to a narrow gap ring head for recording and/or reproducing shorter wavelength signals.

The present invention also provides for an extremely wide compositional range in which the aforementioned characteristics may be achieved.

DESCRIPTION OF THE PREFERRED EMBODIMENTS

Figure 1:
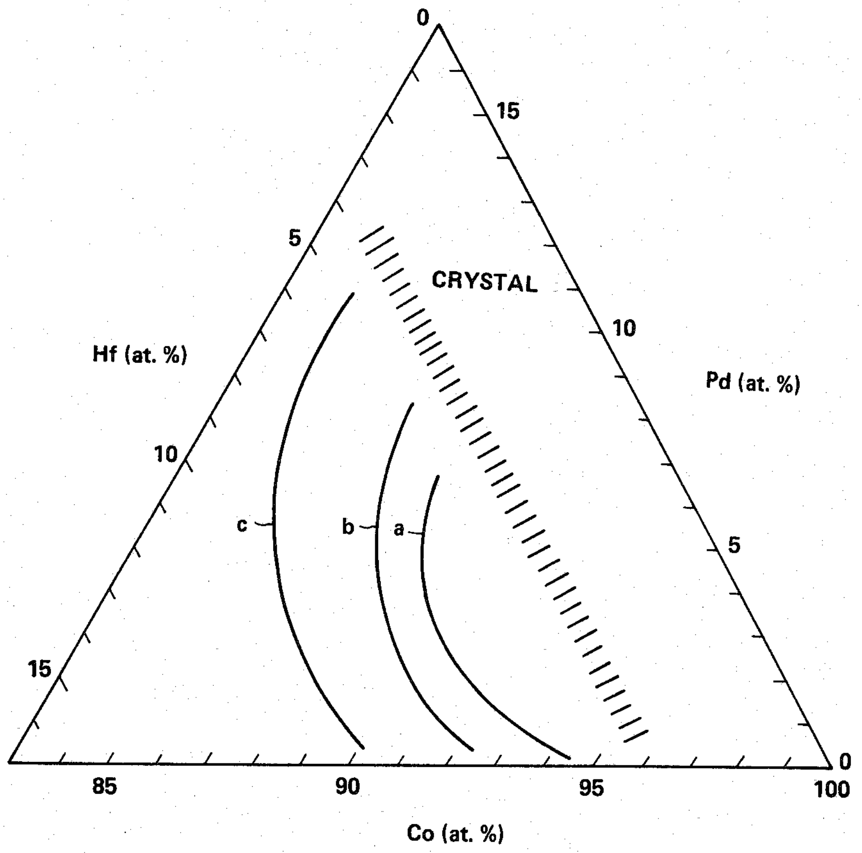
FIG. 1 is a graph showing the relationship between composition and saturation magnetic flux density in the amorphous soft magnetic thin film according to the present invention.

Several preferred embodiments of the amorphous soft magnetic film of the present invention will now be explained.

The amorphous soft magnetic thin film of the present invention consists of a Co-Hf-Pd amorphous alloy prepared by adding Pd to the Co-Hf amorphous alloy which itself is a metal-metal amorphous alloy. In this amorphous soft magnetic film, the contents of Pd and Hf are critical. With higher or lower contents of Pd and Hf, it is difficult to satisfy the requirements for both the saturation magnetic flux density Bs and the saturation magnetostriction constant λs.

For example, with an Hf content less than 4 atomic percent, the alloy tends to crystallize and does not provide an amorphous soft magnetic thin film. With excessively high Hf contents, the saturation magnetic flux density Bs tends to be lowered. When it is desired to achieve a saturation magnetic flux density higher than 15000 Gauss, the Hf content should be 8 atomic percent or less.

It has been found that the addition of a small amount of Pd is effective to lower the saturation magnetostriction constant λs, and it is particularly preferred that the Pd content be higher than 0.5 atomic percent. The larger the amount of Pd, the lower is the saturation magnetostriction constant λs. However, with an excessively high Pd addition, the saturation magnetic flux density Bs tends to be lowered. Therefore, it is particularly preferred that the Hf content be from 4 to 8 atomic percent and the Pd content be from 0.5 to 15 atomic percent, the balance being Co. Thus, the amorphous soft magnetic thin film is represented by the formula:

$$Co_{1-x-y}Hf_xPd_y$$

where x is in the range from 0.04 to 0.08 and y is in the range from 0.005 to 0.15.

The amorphous soft magnetic film may be prepared, for example, by liquid quenching or sputtering. The latter is preferred in instances where the amorphous soft magnetic thin film is used with a perpendicular magnetic recording single pole head for which an extremely small film thickness is required or a narrow gap ring head. The sputtering method can be advantageously applied to the preparation of the amorphous soft magnetic thin film of the present invention because it lends itself to the preparation of thin films of improved bonding properties and with thicknesses of the order of several hundred Angstroms to several millimeters.

Sputtering can be carried out by any of the known methods such as two-pole, three-pole, four-pole, magnetron, high frequency bias, or non-symmetrical a.c. sputtering. The amounts of the elements Co, Hf and Pd making up the amorphous soft magnetic films can be adjusted by any of the following methods.

(1) The elements Co, Hf and Pd are weighed out in predetermined amounts and are fused in advance, for example, in a high frequency oven and cast to form an alloy ingot which can then be used as a target.

(2) A Co target consisting only of Co is prepared and the Hf and Pd targets are placed on the Co target, the number of the targets being adjusted to control the alloy composition.

(3) The respective targets for the elements are prepared and the sputtering speed is controlled with the output or impressed voltage applied to these targets, and hence the alloy composition is controlled.

In the amorphous soft magnetic thin films of the present invention, addition of Pd as one of the alloy components provides a composition for which the saturation magnetic flux density Bs is at least 15000 Gauss and the saturation magnetostriction constant λs is less than $+1.0\times10^{-6}$. In addition, these two requirements can be satisfied over a wider range of alloy composition.

The present invention will be further explained by referring to a specific example. It should be understood, however, that the example is given only by way of illustration and is not intended to limit the scope of the invention.

EXAMPLE

Pieces of Hf and Pd were placed on a Co target. Amorphous soft magnetic thin films were caused to grow on a glass substrate by carrying out a sputtering under the following conditions while the number of these pieces was controlled.

| Sputtering conditions: | |
|---|---|
| Ar gas pressure | $7.0\times10^{-1}$ Pa |
| Power | 200 W |
| Speed of formation | 100 to 300 Å/min. |
| Substrate | glass (water cooled) |

Figure 2:
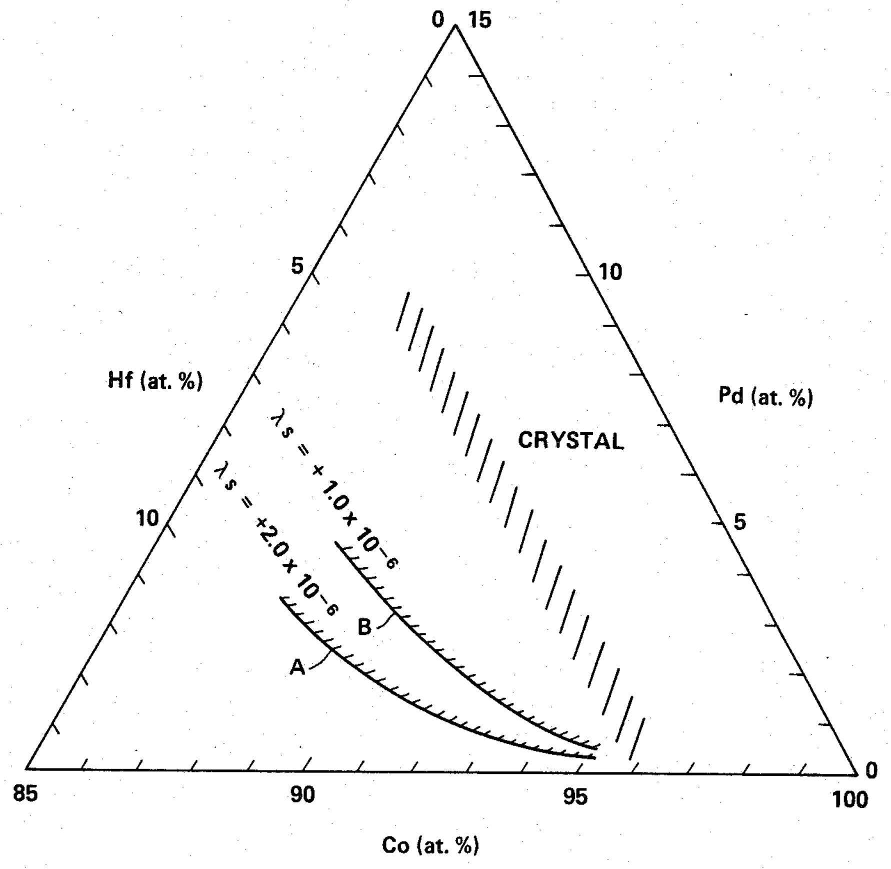
FIG. 2 is a graph showing the relationship between composition and saturation magnetostriction constant λs in the amorphous soft magnetic thin film according to the present invention.

FIG. 1 shows the relationship between the composition of the resulting amorphous magnetic thin film and the saturation magnetic flux density Bs. FIG. 2 shows the relationship between the composition of the amorphous soft magnetic film and the saturation magnetostriction constant λs.

In FIG. 1, the curve a defines compositions where Bs is equal to 15000 Gauss, curve b compositions for a Bs of 14500 Gauss, and curve c compositions for a Bs equal to 14000 Gauss. The region to the right of curve a corresponds to a composition zone for Bs equal to or larger than 15000, the region to the right of curve b defines a composition zone for a Bs equal to or larger than 14500 Gauss, and the region to the right of curve c corresponds to a saturation magnetic flux density Bs equal to or larger than 14000 Gauss.

In FIG. 2, the curve A represents a composition for which λs equals $+2.0\times10^{6}$, and curve B a composition for which λs equals $+1.0\times10^{-6}$. In FIG. 2, the amorphous area to the upper right of the curve A corresponds to at most a λs equal to $+2.0\times10^{-6}$, and the amorphous area to the upper right of the curve B corresponds at most to a λs equal to $+1.0\times10^{-6}$.

It will be seen from FIGS. 1 and 2 that the saturation magnetostriction constant λs becomes gradually smaller upon the addition of Pd and that the high saturation magnetic flux density Bs is simultaneously obtained by controlling the Hf content so as to be within the prescribed range.

It will be understood that various modifications can be made to the described embodiments without departing from the scope of the present invention.

We claim as our invention:

1. An amorphous soft magnetic material having the formula:

$$Co_{1-x-y}Hf_xPd_y$$

where x is in the range from 0.04 to 0.08 and y is in the range from 0.005 to 0.15.

2. The soft magnetic material of claim 1 in the form of a thin film.

3. A magnetic thin film according to claim 2 having a saturation magnetic flux density Bs of at least 15000 Gauss.

4. A magnetic thin film according to claim 2 having a saturation magnetostriction constant λs of no more than $+1.0\times10^{-6}$.

5. An amorphous soft magnetic thin film having the formula:

$$Co_{1-x-y}Hf_xPd_y$$

where x is in the range from 0.04 to 0.08 and y is in the range from 0.005 to 0.15, said film having a saturation magnetic flux density Bs of at least 15000 Gauss and saturation magnetostriction constant λs of no more than $+1.0\times10^{-6}$.

* * * * *